UNITED STATES PATENT OFFICE.

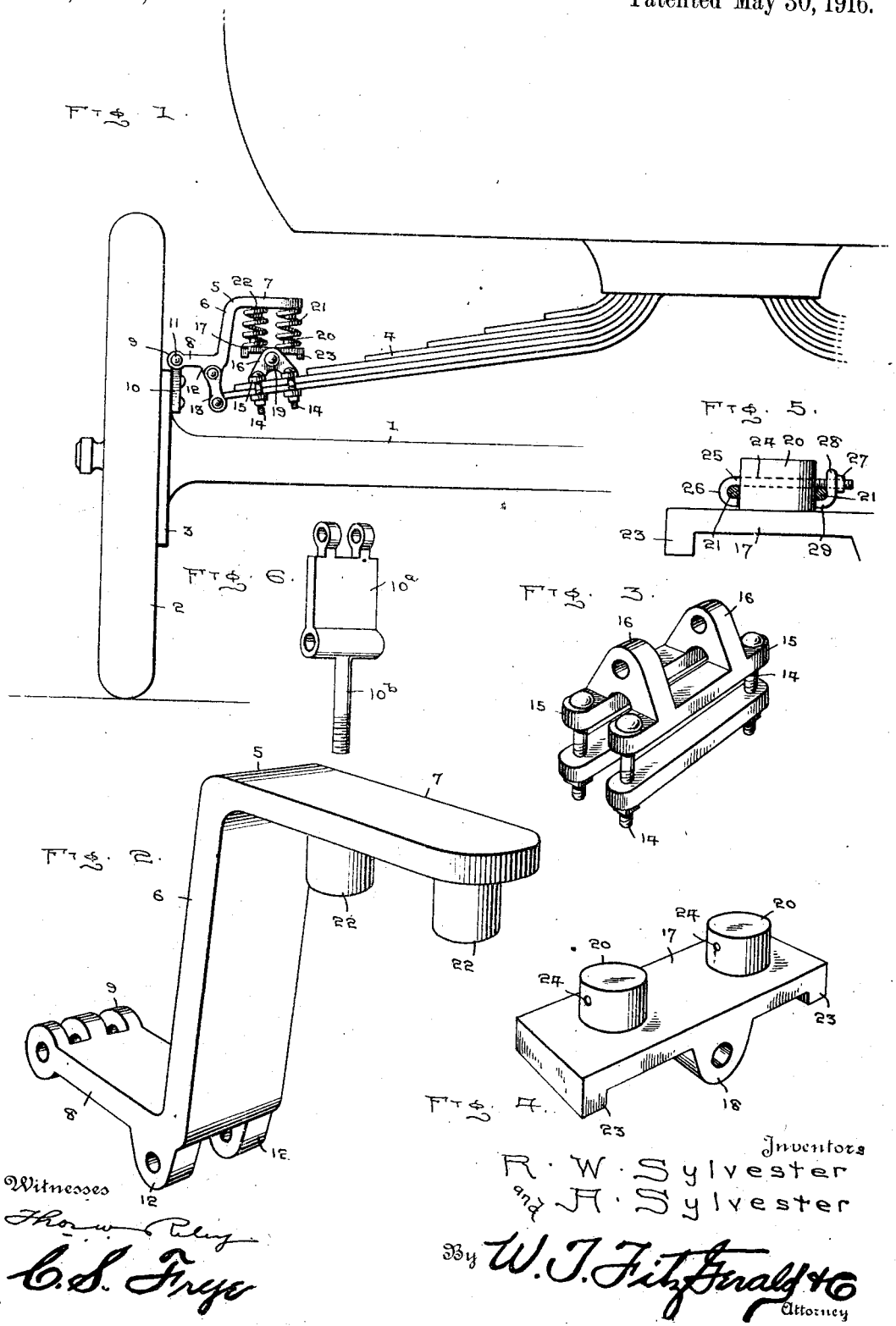

RALPH W. SYLVESTER AND AARON SYLVESTER, OF INDIANAPOLIS, INDIANA.

VEHICLE-SPRING.

1,184,789.  Specification of Letters Patent.  Patented May 30, 1916.

Application filed July 20, 1915. Serial No. 40,859.

*To all whom it may concern:*

Be it known that we, RALPH W. SYLVESTER and AARON SYLVESTER, citizens of the United States, residing at Indianapolis, in the county of Marion and State of Indiana, have invented certain new and useful Improvements in Vehicle-Springs; and we do hereby declare the following to be a full, clear, and exact description of the invention, such as will enable others skilled in the art to which it appertains to make and use the same.

Our invention relates to new and useful improvements in vehicle springs and more particularly to that class used in connection with automobiles, trucks and similar vehicles and our object is to provide means for reducing to a minimum the vibration of the springs and to eliminate the rebound or jar occasioned by the vehicle traveling over the road surface.

Other objects and advantages will be hereinafter set forth and more particularly pointed out in the accompanying specification.

In the accompanying drawings which are made a part of this application, Figure 1 is a rear elevation of a portion of an automobile showing the spring mechanism applied thereto. Fig. 2 is an enlarged perspective view of the hanger used in connection with the spring mechanism. Fig. 3 is a perspective view of a clamp employed for securing parts of the device to the body spring of the vehicle. Fig. 4 is a perspective view of the base plate employed for the reception of the springs used in connection with the device. Fig. 5 is a detail elevation of the base plate showing the manner of securing springs thereto, and Fig. 6 is a perspective view of the support for the hangers at the front end of the vehicle.

Referring to the drawings in which similar reference numerals designate corresponding parts throughout the several views, 1 indicates the rear axle of the automobile, 2 the supporting wheel therefor, 3 the usual form of brake drum and 4 indicates the body spring of the vehicle, all of said parts being of the Ford construction, although it will be clearly understood that they can be of any preferred construction.

In order to mount the ends of the spring 4 in such manner as to practically eliminate the jar incident to the wheels of the vehicle striking obstructions or the rebound of the car body, we provide a hanger 5 comprising a vertical portion 6 and upper and lower laterally extending sections 7 and 8, said sections being substantially at right angles to the vertical portion 6 and projecting from opposite sides of the vertical portion.

The free end of the section 8 is provided with eyes 9 which register with similarly constructed eyes at the upper end of the support 10, said support being secured in any preferred manner to the brake drum 3, and by extending a bolt or rivet 11 through said registering eyes, the hanger 5 will be pivotally suspended from the support.

Formed integral with the section 8 and depending therefrom are ears 12, said ears being adjacent the end connected to the vertical portion 6 and pivotally secured to said ears are straps 13 between which is pivotally secured the outer end of the body spring 4, said spring being thus suspended from the hanger.

Attached to the spring 4 by means of bolts 14, or the like, is a clamp member 15, extending upwardly from which are ears 16 between which is pivotally secured a base plate 17, said base plate having a depending ear 18 which extends between the ears 16 and is pivotally secured thereto by extending a bolt or rivet 19 transversely through said ears.

Extending upwardly from the base plate 17 is a pair of dowels 20 around which are adapted to be positioned the lower ends of coil springs 21, the upper ends of said springs surrounding similar dowels 22 depending from the section 7, said base plate being so positioned as to normally retain said pairs of dowels in vertical alinement with each other.

In order to limit the tilting movement of the base plate 17, the ends of the base plate are provided with depending feet 23. By mounting the body spring to the axle in the manner shown, it will give the outer end of said spring a substantially floating action, said body spring also having limited endwise movement as well as vertical movement.

In applying the device to use in connection with the forward spring of the vehicle, the support 10ª is attached directly to the axle by means of a thread stem 10ᵇ and nut (not shown) as there is no brake drum to receive the same, the action of the parts being identical with those at the rear of the vehicle.

By pivotally attaching the end of the body spring to the hanger as shown and positioning the coil springs between the laterally extending section 7 and the base plate carried by the body spring, said coil springs in effect, carry the weight of the body, and when a blow is received upon the wheels of the vehicle, the jar will first be transmitted to the coil springs and then to the body spring, and in view of the resiliency of these springs, the shock will be so scattered as to prevent the same from being transmitted to the body of the car. It will likewise be seen that by suspending the ends of the body springs in the manner shown, said springs will have an endwise thrust, the movement of which, however, is controlled by the coil springs and by properly extending the feet 23 at the ends of the base plate, the swinging movement of said base plate will be limited to such an extent as to prevent the ends of the coil springs from leaving the dowels with which the ends of the springs engage. And it will likewise be seen that the coil springs will regulate the rebound of the car body should an unusually severe blow be given to the wheels of the vehicle.

To positively secure the ends of the springs 21 to the ends of the dowels 20 and 22, said dowels are provided with transverse openings 24 through which extend bolts 25, one end of the bolt being provided with hook terminals 26, while the opposite ends thereof are threaded to receive nuts 27, said threaded ends also receiving washers 28 having hook members 29 thereon, said hook members 26 and 29 being engaged with the end coils of the springs 21 and when so engaged and the nuts 27 turned home thereon, the springs will be firmly held in engagement with their respective dowels.

Having thus fully described our invention what we claim as new and desire to secure by Letters Patent is:—

1. A spring attachment for vehicles comprising the combination with the body spring of a vehicle and the axle of a vehicle, of a hanger comprising a substantially vertical portion having a lower horizontal extension pivotally connected to the vehicle axle, and having an elongated upper horizontal extension provided with spaced alined dowels upon its under surface and overhanging the end portion of said body spring, means for pivotally connecting said body spring to the lower horizontal extension of said hanger, an elongated base plate pivotally mounted centrally thereof upon said body spring beneath the elongated upper extension of said hanger and provided with spaced alined dowels upon its upper surface at either side of its pivotal point and in vertical alinement with the dowels of said hanger, coil springs interposed between the upper horizontal extension of said hanger and said base plate and having their ends surrounding the respective dowels, and means for retaining the ends of said springs upon said dowels.

2. A spring attachment for vehicles comprising a hanger having a vertical portion and lateral extensions at the upper and lower ends thereof, means to pivotally attach the lower lateral extension to the axle of the vehicle, means to pivotally attach the body spring of the vehicle to the hanger, a tilting base plate carried by the body spring of the vehicle, feet at the ends of said base plate and coil springs introduced between the base plate and upper laterally extending section of the hanger.

3. A spring attachment for vehicles comprising a hanger having a vertical portion and lateral extensions at the upper and lower ends thereof, means to pivotally attach the lower lateral extension to the axle of the vehicle, means to pivotally attach the body spring of the vehicle to the hanger, a base plate carried by the body spring of the vehicle, dowels on said hanger and base plate, bolts extending transversely through the dowels, one end of said bolts having terminals and the opposite ends being threaded, washers having hook members, and a nut engaging the threaded ends of said bolts to draw said hook members into engagement with the end coils of said coil springs.

In testimony whereof we have signed our names to this specification in the presence of two subscribing witnesses.

RALPH W. SYLVESTER.
AARON SYLVESTER.

Witnesses:
 JOHN B. BROWELEY,
 GEO. E. MAIRS.